Dec. 4, 1934.  E. A. STALKER  1,982,968
AIRCRAFT
Filed Oct. 7, 1931  9 Sheets-Sheet 1

INVENTOR
Edward A. Stalker

Dec. 4, 1934.  E. A. STALKER  1,982,968
AIRCRAFT
Filed Oct. 7, 1931   9 Sheets-Sheet 2

INVENTOR
Edward A. Stalker

Dec. 4, 1934.　　　　E. A. STALKER　　　　1,982,968
AIRCRAFT
Filed Oct. 7, 1931　　　9 Sheets-Sheet 3
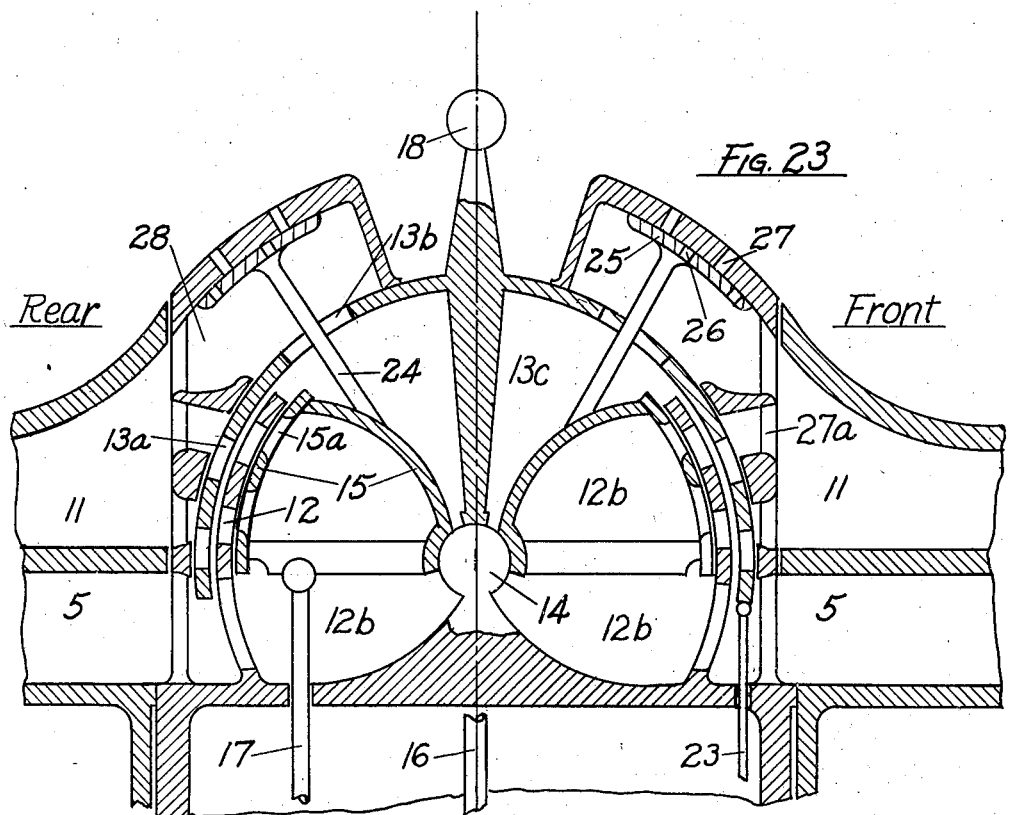
Fig. 23
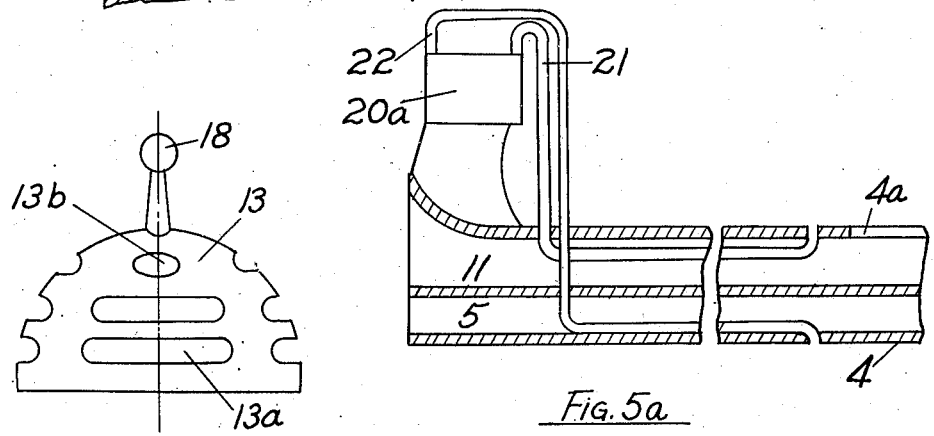
Fig. 18
Fig. 5a
INVENTOR
Edward A. Stalker Dec. 4, 1934.  E. A. STALKER  1,982,968
AIRCRAFT
Filed Oct. 7, 1931   9 Sheets-Sheet 4

INVENTOR
Edward A. Stalker

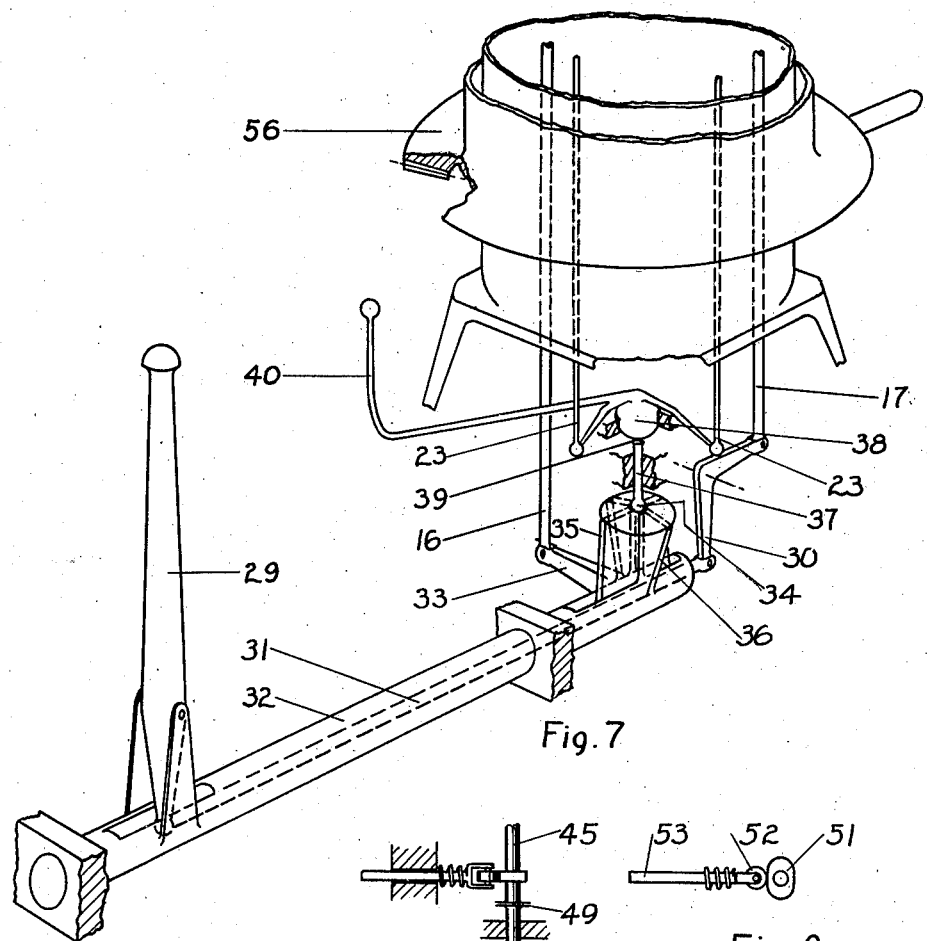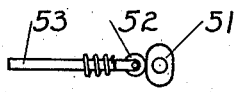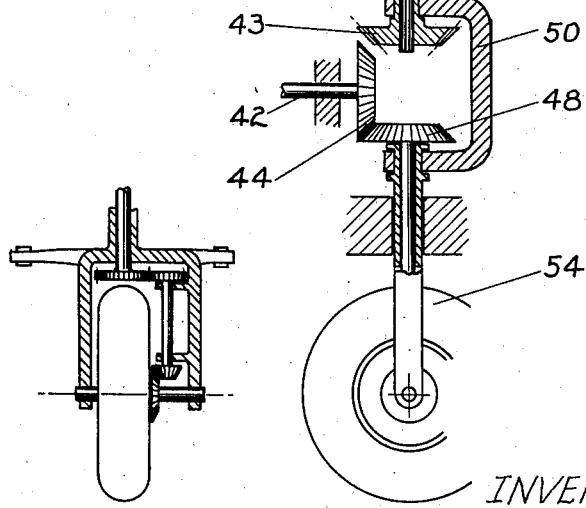

Dec. 4, 1934.　　　E. A. STALKER　　　1,982,968

AIRCRAFT

Filed Oct. 7, 1931　　　9 Sheets-Sheet 7

INVENTOR
Edward A. Stalker

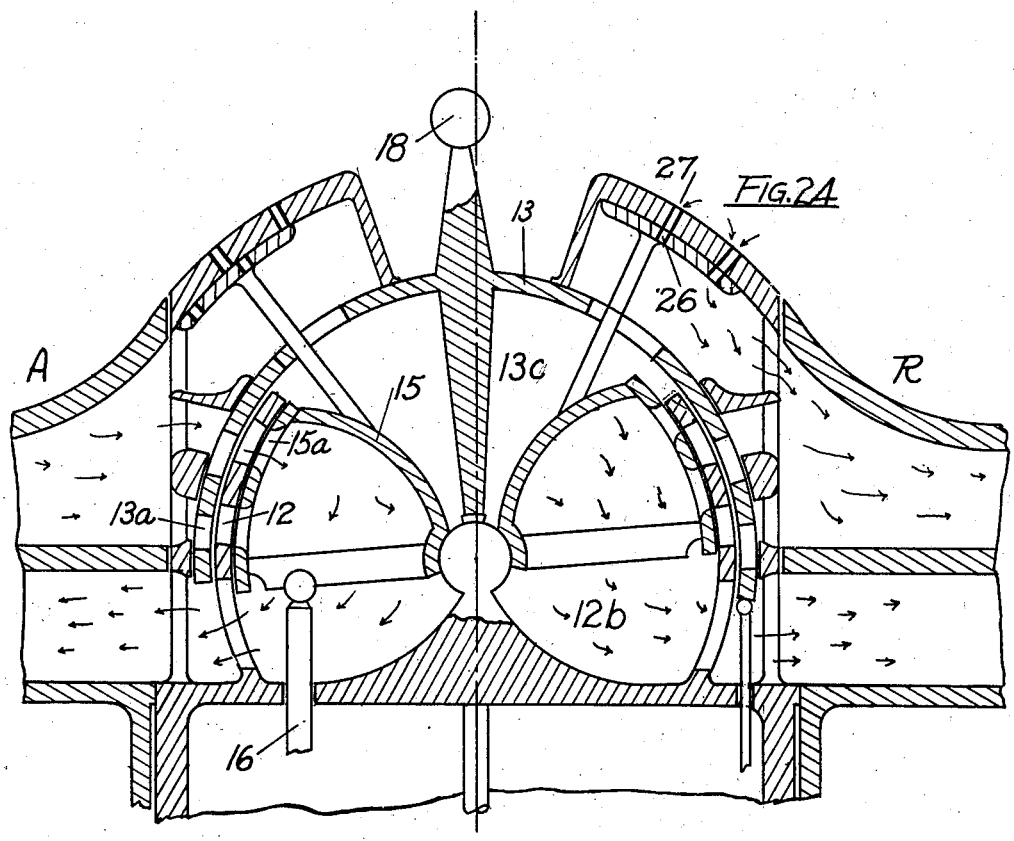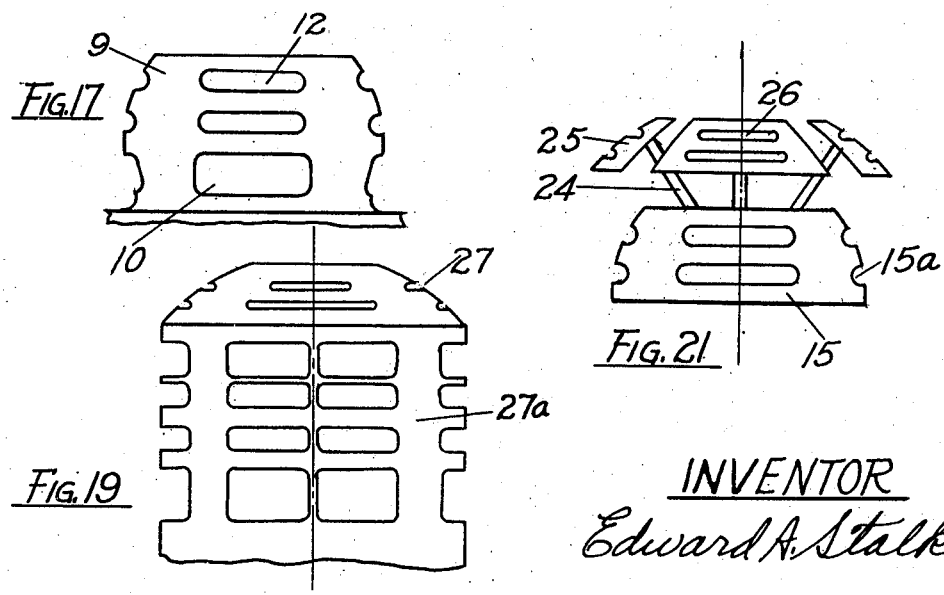

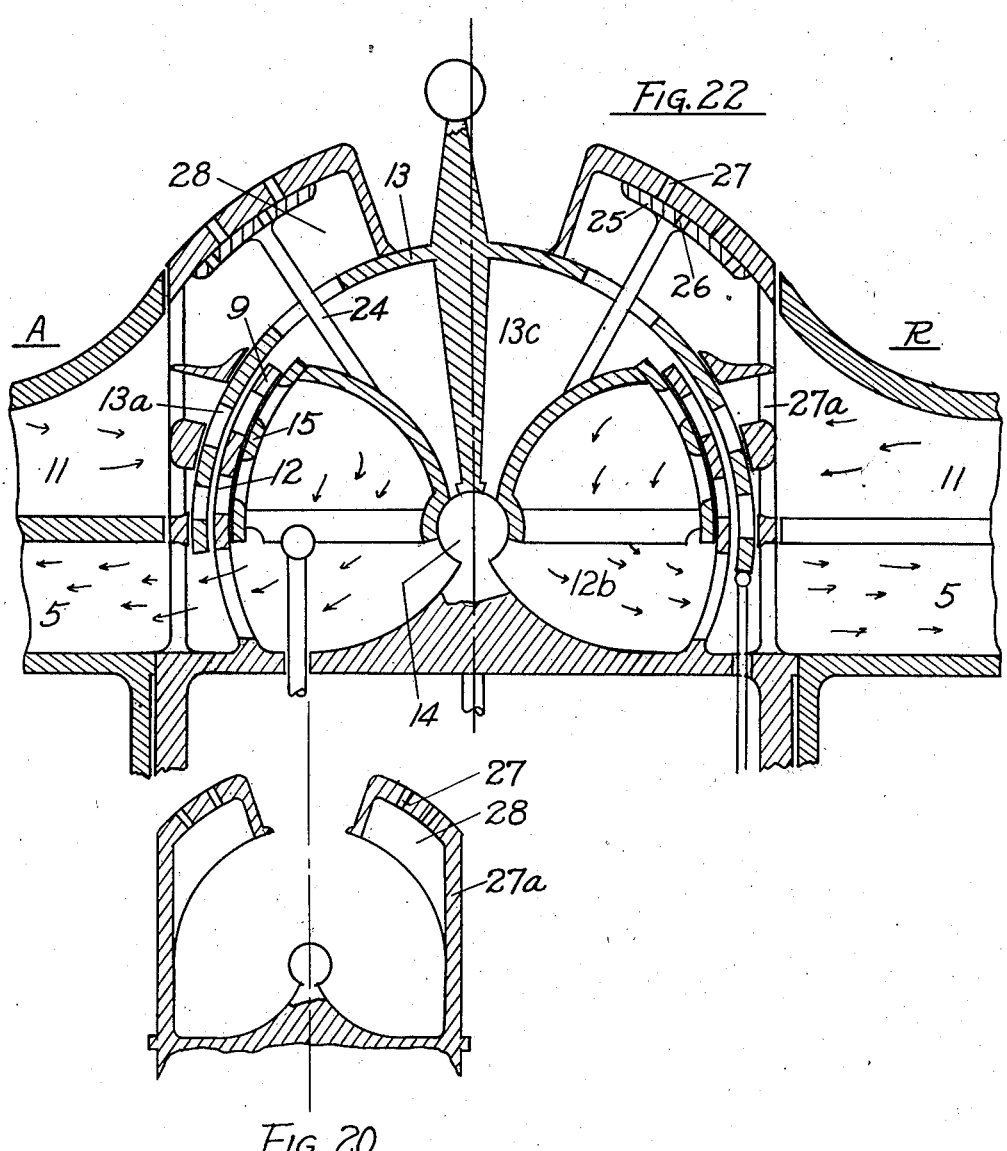

Patented Dec. 4, 1934

1,982,968

UNITED STATES PATENT OFFICE 1,982,968

AIRCRAFT

Edward A. Stalker, Ann Arbor, Mich.

Application October 7, 1931, Serial No. 567,393

7 Claims. (Cl. 244—19)

My invention relates to improvements in aircraft supported directly by an airscrew, and particularly to the balancing and controlling of such an aircraft.

In my patent application filed May 16, 1931, Serial No. 537,809, an elementary method of obtaining balance of the moments of the retreating and advancing blades was set forth. The present invention sets forth improvements and more sensitive balance and control are obtained by the newer devices which make up this invention.

Thus the objects of my invention are first to provide improvements in the balancing of the airscrew by a more sensitive government of the boundary layer; second, to provide a means whereby the boundary layer control devices may be operated by a conventional control stick; third, to provide an improved means of operating the aircraft on the ground; fourth, to provide an automatic means of balancing the aircraft; fifth, to provide a means of obtaining a satisfactory lifting capacity from the inner portions of the retreating blade.

I attain these objects by the devices illustrated in the accompanying drawings in which—

Figure 1:
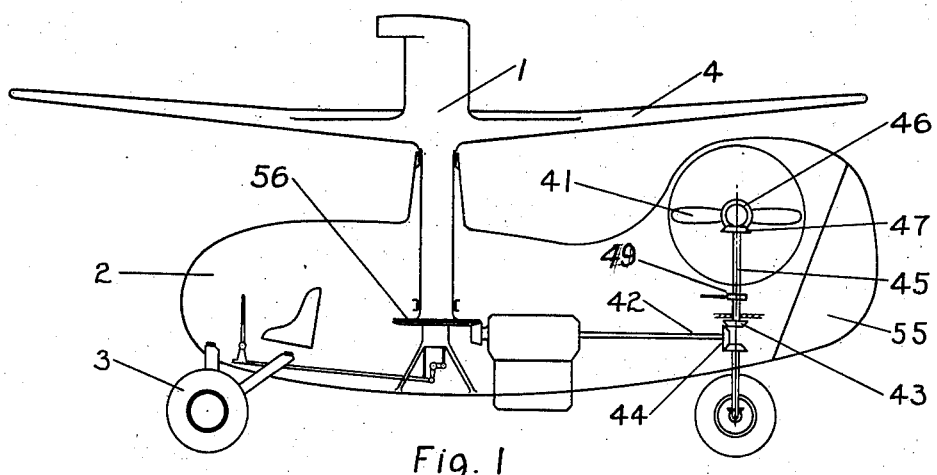
Figure 2:
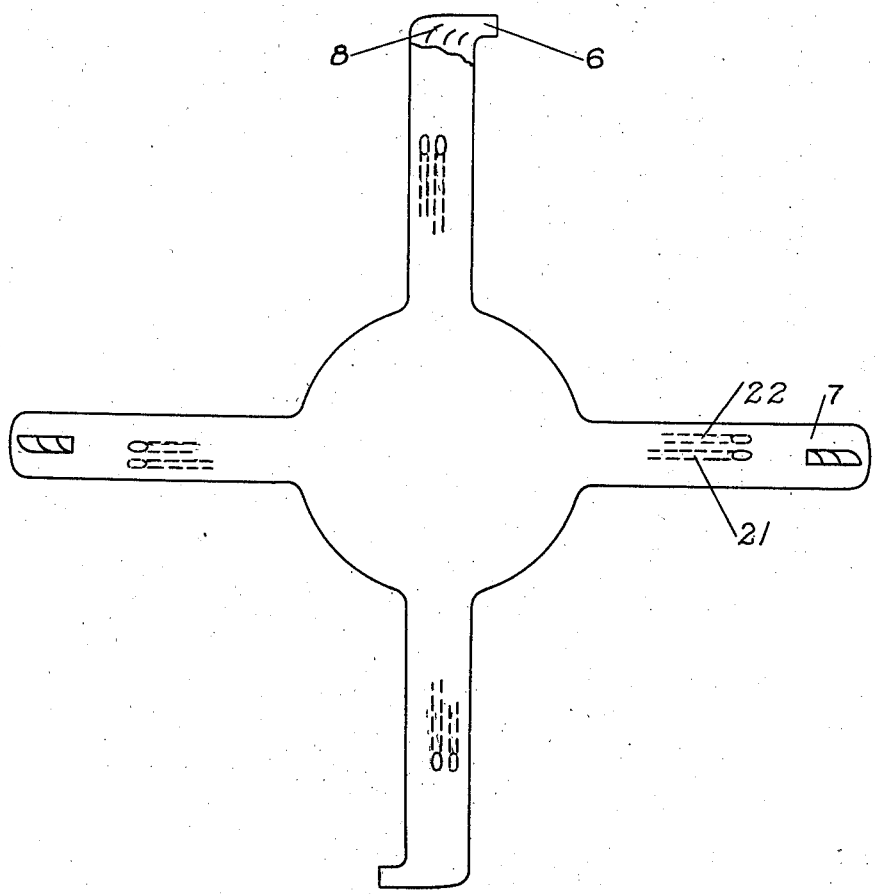
Figure 3:
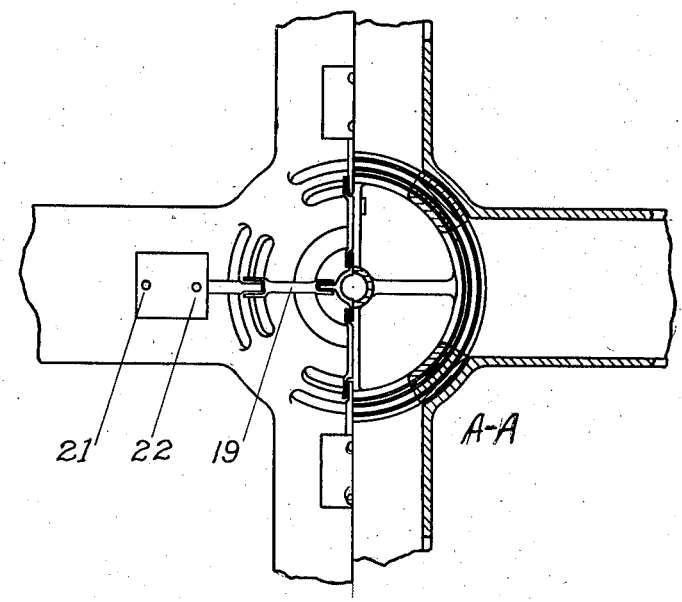
Figures 4, 5:
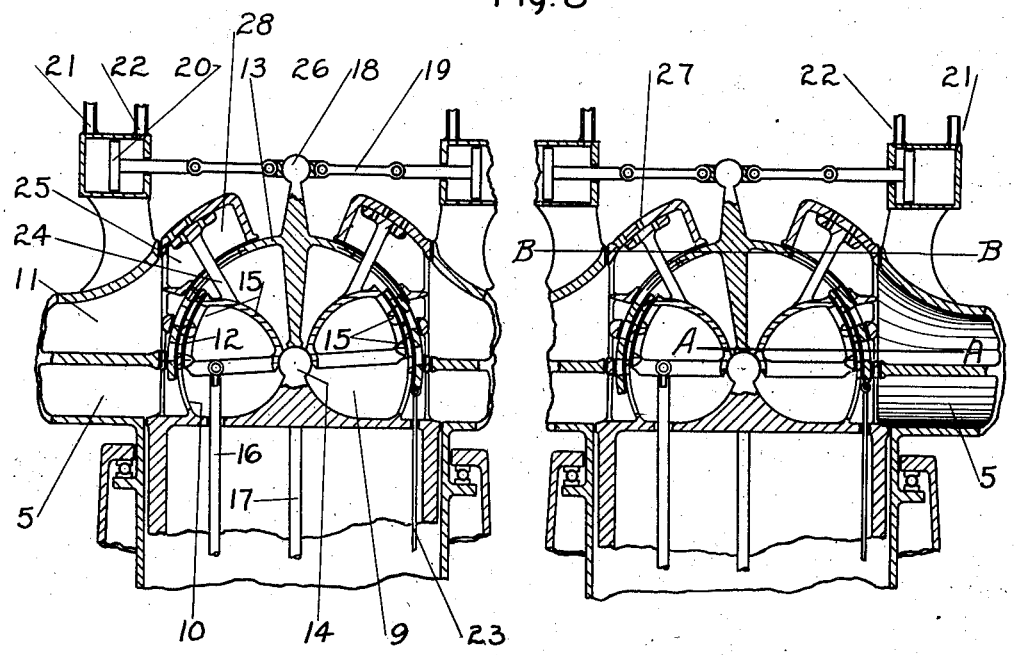
Figure 6:
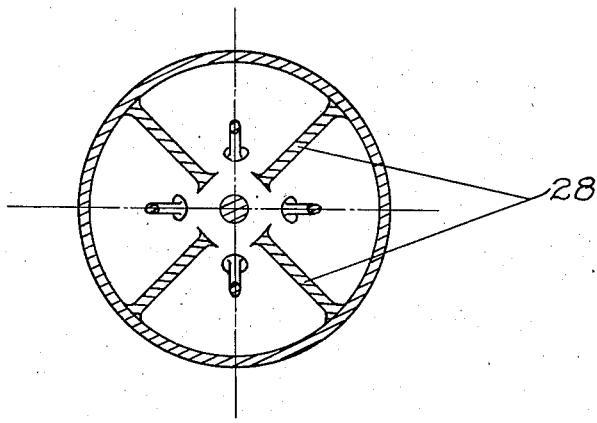
Figures 12, 13:
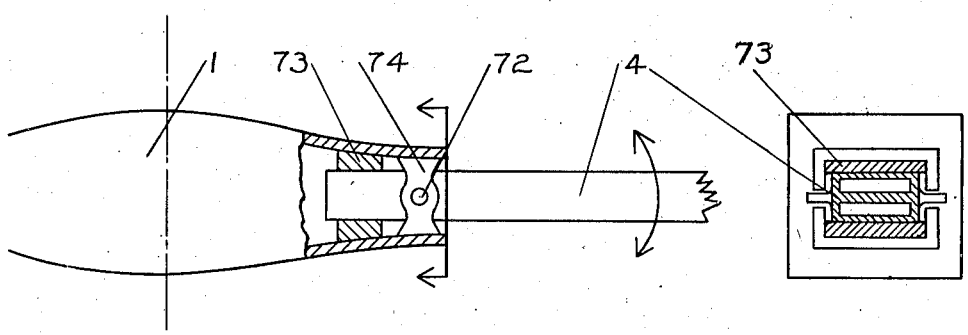
Figure 11:
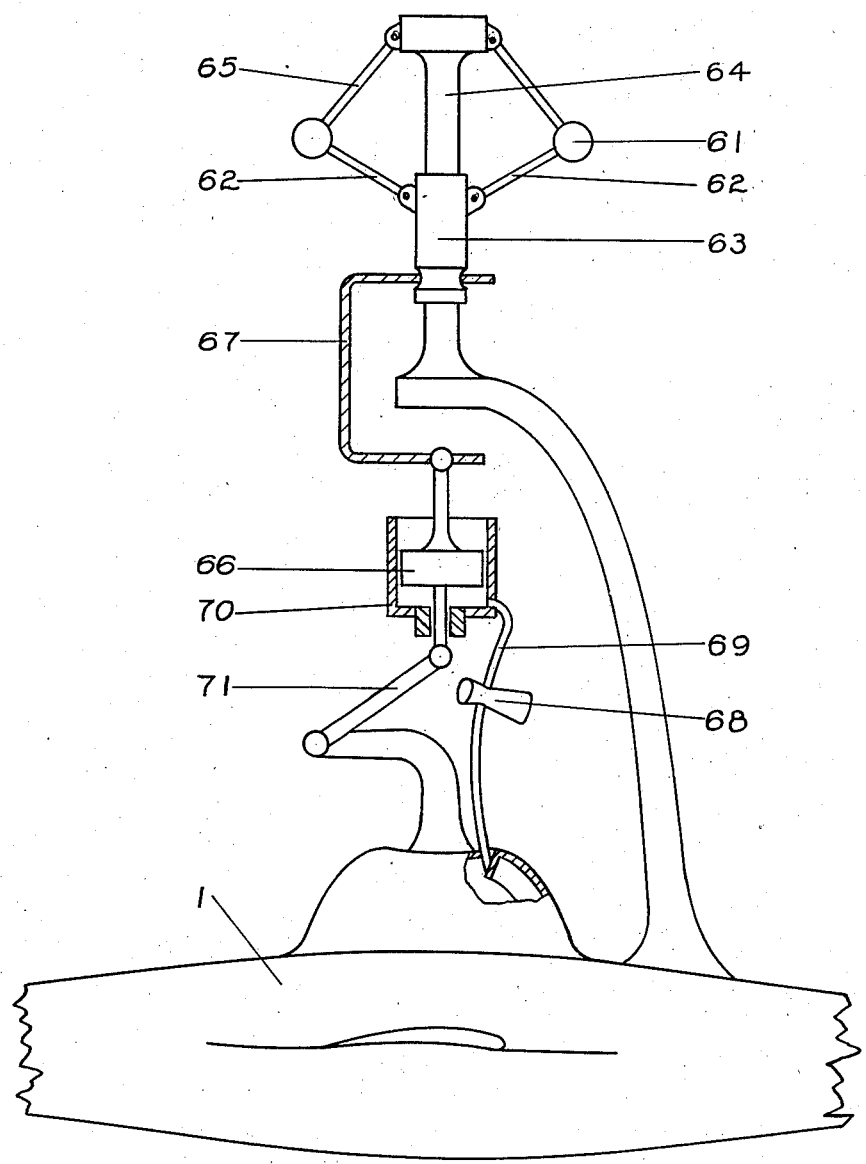
Figure 14:
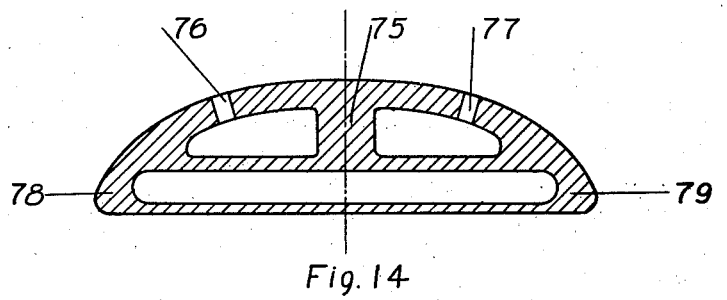
Figures 15, 16:
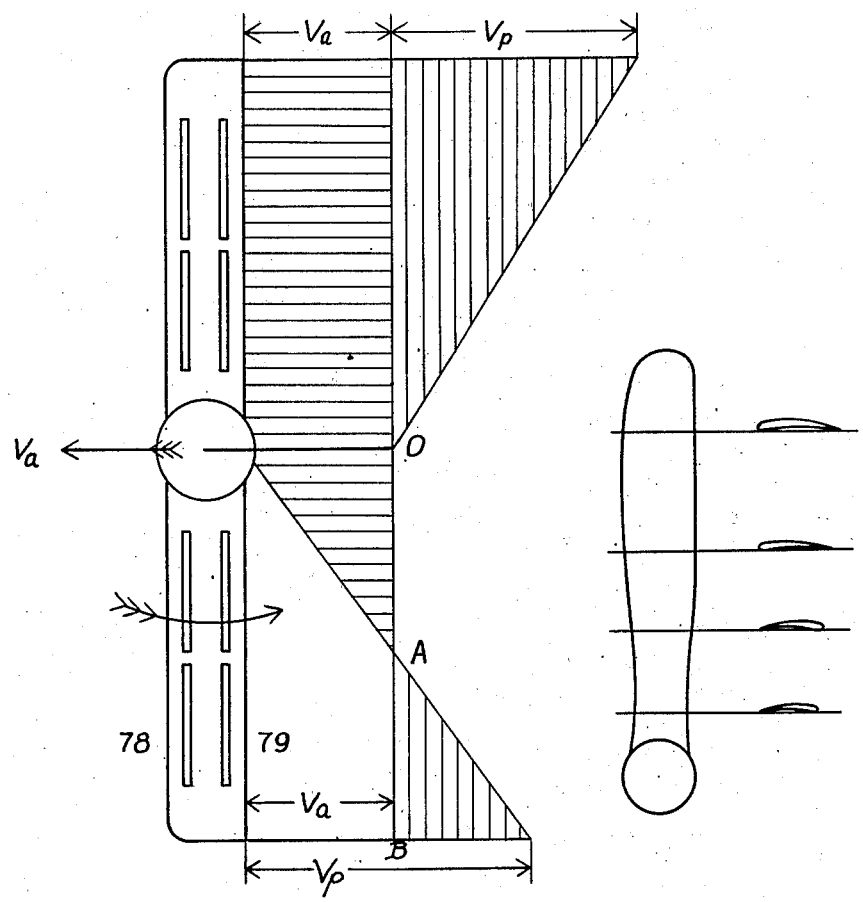

Figure 1 is a side elevation of the aircraft, and Figure 2 is a plan view of the airscrew of the machine in Figure 1. Figure 3 is a horizontal view, partly in section, of the mechanism in the hub by which balance and control are obtained. Figures 4 and 5 are vertical sections of this same device. Figure 5a is a vertical section of a blade showing the pressure tubes and their openings in the blade surface. Figure 6 is a horizontal section through the hub. Figure 7 represents the connection of the control rods to the conventional stick. Figures 8, 9 and 10 depict means of driving and operating the torque propeller and the tail wheel. Figure 11 represents an alternative mechanism for the automatic control of the boundary layer on the blades. Figures 12 and 13 show the method of mounting the blades to reduce shock. Figure 14 shows a symmetrical airfoil section for the blades while Figure 15 shows the velocity distribution for an advancing and a retreating blade. Figure 16 shows an alternative airfoil section arrangement for the blades. Figures 17, 18, 19, 20, 21, 22, 23 and 24 show the elements of the hub mechanism in some detail.

Similar numerals refer to similar parts throughout the several views.

In Figure 1 the airscrew is denoted by 1, the fuselage by 2 and the landing gear by 3. A blade of the airscrew is indicated by 4. The blade has within it the compartment 5 shown in Figure 4. Due to centrifugal force the air in this compartment is thrown outward and is discharged from the exits 6 and 7 at the blade tips. There are guide vanes 8 within to properly direct the flow.

The centrifugal action reduces the pressure in the ball chamber 9 by means of the port 10. The suction is communicated to the upper compartment 11 of the blades by suitable porting. In particular the ball 9 carries ports 12 which are fixed in position but which can be closed by two other spherical surfaces. A surface 13 can be rotated about the support 14 by an automatic action to be described later to close the port 12. Also an interior spherical surface 15 can be rotated by the rods 16 and 17 to close the ports. Openings or slots 4a (as shown in Figure 5a) in the upper surface of the bladed lead into the passage 11 in the blades. In Figures 14 and 15 slots 76 and 77 serve a like purpose. Thus suction created in the shell interior is communicated to the upper surface of the blades and this suction may be used to energize the boundary layer on the blades.

The sphere 13 is actuated by the ball and socket joint 18 which may be moved into any position by the connecting rods 19 and pistons 20. The degree to which the pistons move is governed by the surface pressure on the wing. The pressure on the upper surface is registered through the tube 21 while the pressure on the under surface is registered by 22. In Figure 2 these tubes 21 and 22 are shown in the wing. Thus the movement of 13 is such that it permits most air to be drawn from the wing tending to have the least lift. The increase in the quantity of boundary air removed restores equality of the lift. Figure 5a shows the arrangement of the tubes in the wing in greater detail. If this figure is considered along with Figure 5 it will be readily observed that the suction pressure above the wing is transmitted to the outer end of the pistons 20, and hence the wing with the greater suction will draw the piston toward that wing. The shell 13 will then be rotated to close the ports into the passage 11 of the high lift wing. The universal joints 18a aid in permitting a free movement of the shell 13.

Figs. 22, 23 and 24 are longitudinal vertical sections taken centrally through the control means.

The above device maintains the balance of the airscrew. To control the airplane the balancing device must be interrupted and a device at the control of the pilot substituted. Thus the sphere 13 may be locked in position by a movement of the controls by means of a rod 23 and another one disposed on the circumference of the shell 90° from 23. It is thus behind the rod 17 in Figure 4.

By means of the rods 16 and 17 and the shell 15, the suction of the pump which is constituted by the passages 5, may be shifted to any point on the circumference of the airscrew hub and air can then be withdrawn from a blade in a predetermined position. By this means rolling and diving can be obtained.

The inner shell 15 also carries the arm 24 which in turn carries a section 25 of a spherical surface possessing openings 26 which may register with openings in the outer surface. The openings are arranged so that in normal position the openings are closed, and a movement of the shell 15 opens only one side at a time. The purpose of the openings is to permit an inflow of air to destroy part of the lift on one wing and so to augment the upsetting moment. The wing which receives the air is opposite to the one receiving the most suction. Each of the four sections 25 is segregated from the other, by partitions 28 to prevent the inflowing air to go to wrong blade.

The operation of the rods 16 and 17 is best explained in connection with Figure 7. The airplane is controlled by the conventional stick 29. A fore and aft movement of the stick actuates the bell crank 30 through the connecting link 31. A rotation of the torque tube 32 rotates the arm 33 and hence moves 16 which causes the airplane to roll. Any movement of the stick from neutral raises the ball 34 because it is in a depression in the elements 35 and 36. The raising of the rod 37 locks the ball 38 in place by means of friction at 39, thus determining the positions of the rods 23 and the automatic balancing parts above in the airscrew. A lever 40 can be operated manually against the friction at 34 when desired. In practice a locking device (not shown) would be provided for this lever. It would then function in a manner similar to a stabilizer adjustment but could be used for lateral as well as longitudinal adjustment.

Figure 17 depicts the inner shell 9 as if the rest of the hub were removed. The ports 12 are on the lateral and fore and aft faces.

Figure 18 shows the shell 13 with the ports 13a which are to register with ports 12 of the shell 9 of Figure 17. The opening 13b is to accommodate the arm 24.

Figure 19 represents the hub with the blades and neighboring parts removed. Likewise, its ports are on the fore and aft faces and the lateral faces. There are vertical partitions 28 inside the hub as shown in Figures 6 and 20. The latter is a vertical section through Figure 19. Since the ports face fore and aft and laterally the partitions are at angles of 45 degrees to a vertical fore and aft plane through the hub. These partitions serve to guide the inflowing air from ports 27.

In Figure 21 are shown the shell elements 25 and 15. It is necessary that the elements 25 be divided to clear the vertical partitions 28 which have been described. I have shown the elements 15 also divided but this is not an essential feature and the four pieces might be joined at their vertical edges to make an equatorial band as shown in Figure 3.

The following description gives the mode of operation for various maneuvers of the helicopter.

If the helicopter is flying level and in balance the spherical shell 13 is rotated slightly to the side of the aircraft on which the blade is advancing. See Figure 22. In this position the sphere 13 serves to close partly the openings leading from the interior of the shell to the compartment 11 in the blade. The opening 10 leading from the shell interior to the wing compartment 5 is always open. The openings 27 in the exterior of the hub are also closed because in the central position the holes 26 and 27 fail to register.

The lower compartments 5 of the blades draw air from the hub interior as indicated by the arrows in Figure 22. That is, the boundary layer is withdrawn chiefly from the surface of the retreating blade where the suction pressure is small. Its lift is then made equal to that of the advancing blade. The system is then in balance and will stay in balance unless disturbed. As a wing changes from an advancing blade to a retreating blade it changes its position also with respect to the sphere which is fixed as regards its fore and aft diameter with respect to the aircraft. Thus a wing which has no boundary layer removal while advancing, immediately experiences boundary layer removal when it rotates approximately 180°.

It is not necessary that there be a great difference in the size of the flow channel through the ports leading to the retreating and advancing blades because of the great difference in pressure existing over the upper surfaces of the two blades. Because a lower pressure exists over the retreating blade than over the advancing blade more air will always be drawn from this blade. When the lifts of the two blades become equal the same amount of air will be drawn from each and the condition of lift equality will be maintained which is the desideratum.

In steady horizontal flight with a properly chosen location of the center of gravity of the helicopter the shell 13 is not tilted fore or aft. With other center of gravity locations a tilt of the shell becomes necessary. Figure 23 is a longitudinal vertical section through the hub and indicates the positions of the various parts under the condition of steady forward motion. The structure is symmetrical fore and aft about the center line. It will be readily observed that a tilt of the shell 13 toward one blade will close the ports into the wing passage 11 and reduce the lift of the blade. This would correct any tendency of the same blade to rise.

The tilting of 13 may be arranged to occur automatically by the piston-cylinder arrangement 20 as shown in Figures 3, 4 and 5.

To understand the means of control consider Figure 24 in which the sphere 13 is shown as for lateral balance. Let it be desired to roll the helicopter in a direction to lower the retreating blade indicated by R. When the stick 29 (Figure 7) is moved to one side the rod 16 is pulled down. At the same time the sphere 13 is locked in position by the parts 34 and 39 as described earlier. The rod 16 rotates the inner sphere 15 into the position shown in Figure 24. The ports 12, 13a and 15a leading into the blade now register so that the boundary layer is removed from the advancing blade. In the same instance the ports leading into the retreating blade are closed but the upper ports 26 and 27 register. Thus air is admitted to the retreating blade and reduces its lift. The final result is a roll with the advancing blade rising. A reversal of the control stick will reverse the port arrangement and cause the opposite roll. Since the shell 15 has a closed top surface, air from the ports 26 and 27 cannot reach the compartment 12b.

Pitching may be induced by a fore and aft movement of the control stick. See Figure 23. A forward movement of the control will push the rod 17 up closing the ports 12 in front and opening the same in the rear. The helicopter will then dive. For this maneuver I prefer to use the lever 40 to fix the position of the shell 13.

Since the spheres 13 and 15 are universally mounted the lateral and the fore and aft ports may form innumerable combinations and the aircraft may be pitched and rolled at the same time.

In my previous patent application mentioned above the counter torque of the main airscrew was opposed by an airscrew in the tail wheel. For reasons of maneuvering in the air it will be desirable to have the thrust of the torque propeller at the level of the center of gravity of the airplane. The upper position shown in Figure 1 is desirable because the c. g. will be above the longitudinal center line of the fuselage. In this position the torque propeller 41 is driven by the engine shaft 42 through bevel gears 43 and 44, a shaft 45 and bevel gears 46 and 47. When the helicopter is in the air the gears 43 and 44 are in mesh and 44 and 48 are out of mesh. A flexible clutch 49 takes up the shock of the meshing. (See Figure 8.) In landing the frame 50 is pushed up by the ground reaction on the wheel and 44 and 48 engage while 42 and 43 disengage. The motor power is then applied to the ground through the tail wheel 54.

The main use of the torque propeller 41 is in vertical rising. In horizontal flight at appreciable speeds the fin and rudder will furnish sufficient counter torque. It is desirable to stop the propeller in a position offering the least resistance, that is, a horizontal position if the propeller is two-bladed. This position may be obtained by fitting the shaft with a cam 51 and another spring tensioned roller 52. The rod carrying roller 52 may be slidably withdrawn by hand.

In maneuvering it will be desirable to have the lateral force on the fin and rudder as low as possible to help bank the airplane correctly in a turn. For this reason as much of the fin and rudder area should be below the center of gravity of the airplane. The rudder 55 should be given the shape shown in Figure 1, that is, a large area near its lower extremity.

Instead of using the automatic piston device illustrated in Figures 3, 4, and 5 it may sometimes be desirable to use a device based on a somewhat different principle.

When an airscrew is travelling forward in a horizontal plane with no provision for increasing the lift on the retreating blade, the degree of unbalance is a function of the tip speed of the blade and the speed of advance of the aircraft. Then the centrifugal force on a weight whirled by the airscrew will be a measure of the tip speed. A Venturi tube will register a force which depends on the speed of advance. These two forces may be combined so that for a given ratio between them, the sphere 13 of Figure 4 will take up a position to balance the airscrew laterally. Figure 11 illustrates such a device. Two balls 61 are acted upon by centrifugal force. They are connected by links 62 to an element 63 slideable on the shaft 64. The rotation of the balls is accomplished by the shaft 64 which is rigidly connected to the balls by the links 65. The shaft is rigidly connected to the main airscrew 1 and thus rotates at the speed of airscrew. When the balls fly out they tend to raise the piston 66 by means of the connector 67. The movement of the piston is opposed by the suction communicated to it by the venturi 68 and the tube 69. The position of the piston in the cylinder 70 is thus determined by the rate of rotation and the forward speed. The position of the piston determines the position of 13 due to the connecting link 71. The Venturi tube may be connected to the stationary member which carries the openings 27. See Figure 5. The tube 69 also serves as a support for the cylinder 70.

In maneuvers such as a sharp pull up from a dive, it is desirable to provide some shock absorbing means. The shock absorbers should not begin to operate until the blade load exceeds normal load. One device for shock absorption is shown in Figures 12 and 13. The blade is hinged at 72 in an extension of the hub. At 73 are shown compressed rubber blocks to absorb the shock. If desired the rubber blocks could be replaced by any of the spring or fluid shock absorbers.

For high speed machines for special service the helicopter will be fitted with wings or blades whose section is formed from a circular arc as in Figure 14. The section is thus symmetric fore and aft. A vertical rib 75 separates the interior into two halves. Through the upper surface of each there are slots 76 and 77 respectively. The suction pressure may be adjusted so that when the edge 78 is the leading edge there is very little flow in through the opening 76. That is, the suction outside the wing is high at the leading edge. The reverse is true at the trailing edge so there will be an appreciable inflow at 77 which will augment the lift.

Now in Figure 15 consider the two-bladed airscrew advancing with the velocity $V_a$ and rotating with the tip speed $V_p$. The velocity of advance may be represented by the rectangle $V_a$ high.

The velocity due to rotation drops to zero at the center 0. On the advancing side then the tip velocity is $V_p+V_a$ at the tip and $V_a$ at the center. On the retreating blade the velocity of advance opposes the peripheral velocity so that at the tip the velocity is $V_p-V_a$. At the center 0 the air velocity is $V_a$. At A the velocity is zero. Thus over the section AB of the blade the air velocity is from 79 to 78 while over the section A0 the air velocity is from 78 to 79. By providing the slots 76 and 77 the boundary layer will in each case be removed from the rear portion and the symmetrical blade will behave like an efficient airfoil section of conventional form.

I have shown the symmetrical airfoil as a preferred form where the inner sections of the retreating blade are made to lift due to the velocity of advance of the aircraft. An alternative method is to reverse the leading and trailing edges of the inner section of the airscrew blade as shown in Figure 16. The preferred form is, however, the symmetrical section.

In this application the term airscrew is used broadly to indicate any rotating wing device which furnishes a transverse force.

The sides of the blades which are toward the direction of the thust or lift are called the upper or top surface of the blade.

A moment or couple whose plane of action is transverse of the plane of rotation of an airscrew is called a transverse moment.

I claim:

1. In a horizontally rotatable wing, a wing body, a channel extending longitudinally within the wing and having an outward and rearward discharge at the outer wing tip, and having openings leading from the upper surface of the inner portion of the wing into the channel.

2. In an aircraft, a supporting airscrew having blades rotatable about a substantially vertical axis, means for unsymmetrically altering the lift of the blades on opposite sides of the aircraft to balance the transverse lift moments of the airscrew, and inertia means operable at speeds coordinated with the speeds of the airscrew for automatically controlling the degree of lift alteration in accordance with the rotative speed of the airscrew.

3. In an aircraft, a supporting airscrew having blades rotatable about a substantially vertical axis, means for unsymmetrically altering the lift of the blades to balance the transverse moments of the airscrew, and means sensitive to changes in forward wind pressure for automatically controlling the degree of lift alteration.

4. In an aircraft, a supporting airscrew having blades of constant volume rotatable about a substantially vertical axis, means for unsymmetrically altering the lift of the blades to balance the transverse moments of the airscrew, an air chamber having a movable element for controlling said means, and means for subjecting said air chamber to the forward wind pressure.

5. In an aircraft, a supporting airscrew having blades rotatable about a substantially vertical axis, means for unsymmetrically altering the lift of the blades to balance the transverse moments of the airscrew, inertia means operable at speeds coordinated with the speeds of the airscrew, a wind pressure sensitive device, and means for coordinating the forces of the inertial means and the said device for the automatic regulation of the degree of lift alteration.

6. In an aircraft, supporting rotatable blades of constant volume having openings in the blade surfaces adapted for a flow therethrough to energize the boundary layer of air, means for regulating the flow through said openings to relatively change the lift movements of the blades on opposite sides of the blade axis of rotation, and a pressure sensitive means operable in accordance with changes in forward speed of the aircraft for automatically controlling said regulating means.

7. In an aircraft, a lifting screw having blades rotatable about a substantially upright axis, openings in the upper surfaces of the blades for energizing the boundary layer, each blade having a compartment extending longitudinally of the blade and communicating with the openings in the blade surface, each blade having a passage extending longitudinally of the blade adjacent the blade compartment and communicating with the blade compartment at its inner end, and each blade having means at its tip portion for discharging air rearwardly from its passage.

EDWARD A. STALKER.